United States Patent [19]
Aoki

[11] Patent Number: 4,703,912
[45] Date of Patent: Nov. 3, 1987

[54] MOLD TEMPERATURE CONTROLLING APPARATUS

[76] Inventor: Katashi Aoki, 6037 Ohazaminamijo, Sakaki-machi, Hanishina-gun, Nagano-ken, Japan

[21] Appl. No.: 725,374

[22] Filed: Apr. 22, 1985

Related U.S. Application Data

[63] Continuation of Ser. No. 526,788, Aug. 26, 1983, abandoned.

[30] Foreign Application Priority Data

Aug. 31, 1983 [JP] Japan ............................ 57-151175

[51] Int. Cl.⁴ ..................... B29C 39/38; B29C 45/72
[52] U.S. Cl. .................................... 249/81; 164/348; 249/119; 249/129; 425/526; 425/552

[58] Field of Search .................... 249/78–81, 249/119, 129; 425/547, 552, 526, 548, 588; 164/348

[56] References Cited

U.S. PATENT DOCUMENTS 2,106,614  1/1938  Lindner ........................... 249/79
3,116,516  1/1964  Moslo ............................. 425/526
3,843,286  10/1974  Hoberg et al. ................. 425/526

Primary Examiner—Willard E. Hoag
Attorney, Agent, or Firm—Louis Weinstein

[57] ABSTRACT

Plural mold cavity defining mold block with particular arrangement of bored and plugged conduits for heat transfer fluid. The molds being particularly useful in blow-molding.

7 Claims, 4 Drawing Figures

MOLD TEMPERATURE CONTROLLING APPARATUS

This is a continuation of application Ser. No. 526,788, filed Aug. 26, 1983 and now abandoned.

BACKGROUND OF THE INVENTION

This invention relates to a temperature controlling method for a mold which is used to mold a synthetic resin, and particularly to a mold temperature controlling method which can be applied to injection molds, parison temperature controlling molds, blow molding molds and the like in which a plurality of cavities are placed side by side.

In the injection mold and the parison temperature controlling mold having a plurality of cavities placed side by side, heating medium flowpassages for cooling or heating are provided one for each cavity to maintain a mold surface temperature of each cavity uniform. For this reason, there were problems in that the construction of mold is complicated, an expensive temperature controlling device must be provided on each cavity, resulting in a higher cost of the mold, and the like.

In view of the foregoing, the present inventor has made a repeated study of control of mold temperature by fluid in an attempt of solving the aforementioned problems and as a result found a new method which can maintain the temperatures of a number of cavities placed side by side at the same temperature by an extremely simple means irrespective of the side-by-side position.

SUMMARY OF THE INVENTION

An object of the invention is to provide a new mold temperature controlling method which can be applied to injection molds, parison temperature controlling molds by heat exchange, blow molds and the like having a plurality of cavities placed side by side at regular intervals, which is manufactured to form flowpassages for a cooling medium or a heating medium, and which is designed to maintain a temperature of each cavity almost uniformly.

According to the present invention which has the above-described objects, two main long flowpassages across sides of the cavities are laterally bored in side projected surfaces at upper and lower positions of a mold having a plurality of cavities placed side by side at regular intervals, longitudinal branch flowpassages bored between the cavities are brought into communication with said main flowpassages in such a manner that the branch flowpassages cross the main flowpassages in the side projected surfaces to constitute ladder-like temperature controlling flowpassages, and a cooling medium or a heating medium is allowed to flow from one to the other of the temperature controlling flowpassage to control the temperature of each cavity uniformly.

A spacing between the flowpassages in the temperature controlling flowpassage is determined depending on the dimension of the cavity of the mold, the spacing being set constant including the distance with respect to the center of the cavity. Each of the flowpassages may be formed in an extremely simple manner, by blocking ends of the holes having the same diameter longitudinally and laterally bored at predetermined positions of the mold. An inlet and an outlet for fluids such as a cooling medium may be formed by alternately blocking one end of only the main flowpassage, and the distance which extends from the inlet to the outlet of the temperature controlling flowpassage will be the same irrespective of selection of any branch flowpassage. As long as the diameter of the flowpassages is constant, the flow resistance is the same and the flow rate will not be different depending on the branch flowpassages. Thus, the cooling medium or heating medium introduced into the mold from the inlet of the temperature controlling flowpassage will cool or heat, before reaching the outlet, and the mold will be under the same condition irrespective of the position of the branch flowpassage, as a consequence of which the temperature of each cavity is maintained nearly at the same temperature. Moreover, controlling of the flow rate or temperature of the medium can be effected at one place and the construction of the mold can also be simplified.

BRIEF DESCRIPTION OF THE DRAWINGS

The drawings illustrate a parison temperature controlling mold which employs a mold temperature controlling method in accordance with the present invention.

DESCRIPTION OF THE PREFERRED EMBODIMENTS

Figure 1:
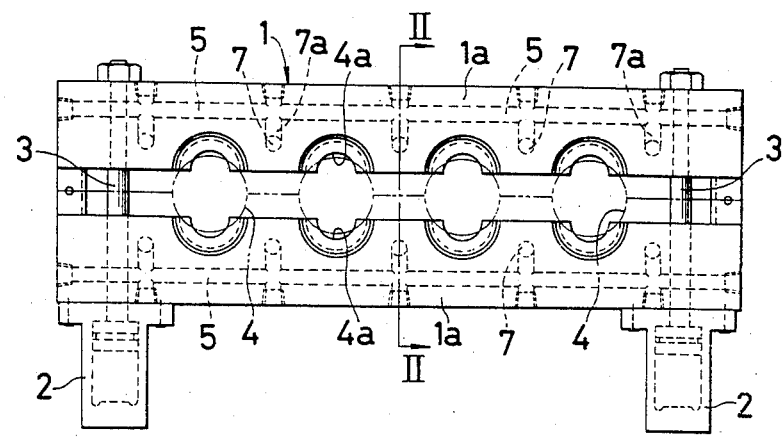
FIG. 1 is a plan view of a mold assembly embodying the principles of the present invention, and showing the mold in the opened position.
Figure 3:
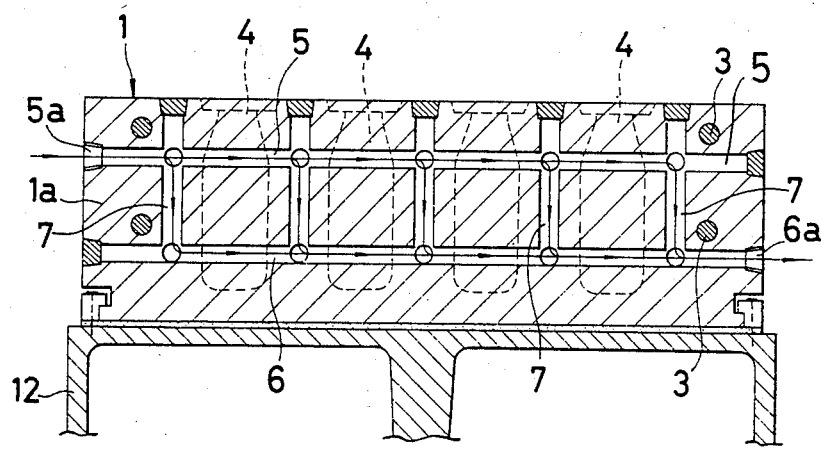
FIG. 3 is a sectional view of the mold taken on line III—III of FIG. 2.
Figure 2:
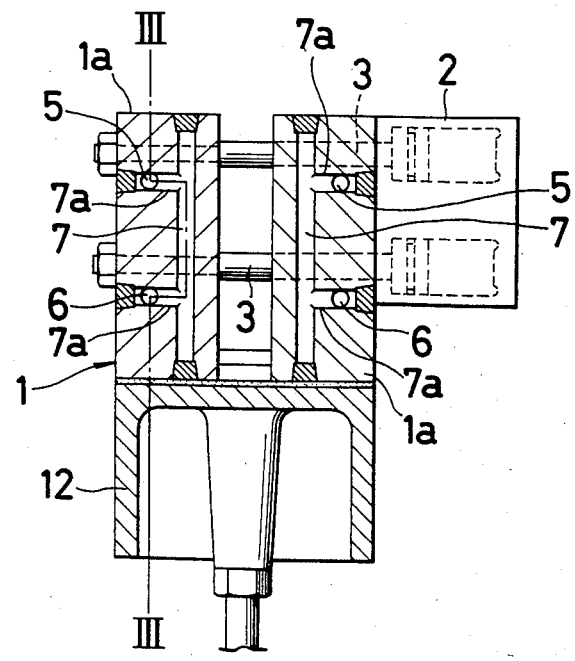
FIG. 2 is a sectional view of the mold taken on line II—II of FIG. 1.

A preferred embodiment of the present invention will now be described in detail in conjunction with the accompanying drawings.

In the drawings, a reference numeral 1 designates a parison temperature controlling mold composed of a pair of sectional molds 1a, 1a, said mold being opened and closed by hydraulic cylinders 2 and piston rods 3 provided on both ends thereof.

The sectional molds 1a and 1a are respectively provided with concave portions 4a, 4a which form four cavities 4, 4, at regular intervals. Two main flowpassages 5 and 6 are bored up and down at regular intervals at positions across the side of the cavities 4, 4 in the side projected surface of the sectional molds 1a and 1a, and one end of each of the main flowpassages 5 and 6 is alternately blocked to form an inlet 5a and an outlet 6a of the temperature controlling flowpassage.

The main flowpassages 5 and 6 each communicate with five longitudinal branch flowpassages 7, 7 bored in the central portion between the cavities 4, 4 to form a flowpassage in the form of a ladder in the side projected surface.

The main flowpassages 5, 6 and branch flowpassages 7, 7 are provided up and down and to left and right at regular intervals, and the distance thereof from the center of the cavities is exactly the same.

For this reason, the branch flowpassages 7, 7 are bored more deeply into the temperature controlling mold than the main flowpassages 5, 6, and connecting flowpassages 7a, 7a in communication with both the flowpassages are provided from the side of the mold. Formation of each flowpassage may be extremely simply achieved by longitudinally and laterally boring holes of the same diameter in a predetermined position of the temperature controlling mold and blocking the ends of these holes.

In the above-described temperature controlling flowpassage, the fluid passes through either branch flowpassage 7 during the passage from the inlet 5a to the outlet 6a. In either case the fluid flows through the branch flowpassage 7 nearest to the inlet 5a or in the case where the fluid flows through the branch flowpassage 7 nearest to the outlet 6a, the flow rate is the same and there is no great difference in thermal influence on the entire temperature controlling mold, and therefore, temperature of the cavities is also nearly constant.

Figure 4:
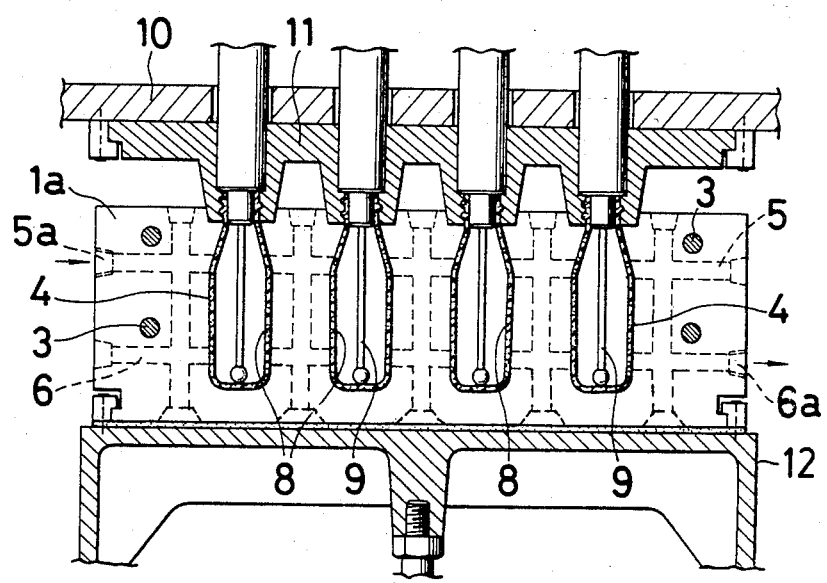
FIG. 4 is a longitudinal sectional view showing the parison temperature controlling condition.

As shown in FIG. 4, parisons 8, 8 held by a neck mold 11 mounted on the lower surface of a transport plate 10 are received into the temperature controlling mold 1 by upward movement of the temperature controlling mold 1 set on a temperature controlling mold supporting bed 12, and the mold is closed by the hydraulic cylinders 2, after which the parisons 8, 8 within the cavities 4, 4 are pressed against the cavity surfaces by axial stretching by rods 9 and by air blowing, then the temperature of parisons is controlled to a predetermined level by heat exchange. Since the temperature of each of the cavities is controlled to be nearly the same, each of the parisons is also controlled to the same temperature.

Next, a temperature controlling example is given.
Kind of mold: Parison temperature controlling mold (sectional type)
Dimension of mold: Height - 175 mm, lateral width - 940 mm, longitudinal width - 85 mm×2
Number of cavities: Eight (for 1 l bottle)
Main flowpassage: Two, length - 870 mm, diameter - 14 mm
Branch flowpassage: Nine, length - 75 mm, diameter - 14 mm, spacing - 100 mm
Heating medium: 84° C.
Flow rate: 70 l/min.
Temperature of cavity: 83°±0.5° C. (surface temperature)

What is claimed is:

1. A mold with means for uniformly controlling temperatures of surfaces defining plural mold cavities positioned side-by-side at regular, uniform intervals for simultaneously forming a plurality of molded articles, comprising:

a pair of mold halves each having an engaging surface and a plurality of said cavities formed in said engaging surface and arranged at spaced intervals;

the engaging surfaces being adapted to contact one another during a molding operation;

the cavities in each engaging surface being aligned to form composite cavities for producing a molded member when the engaging surfaces are in contact;

two elongated main flowpassages extending across one side of all of the cavities in the side projected surface and being arranged at upper and lower portions of said mold adjacent said engaging surface, each of said main flowpassages being open at opposite sides of the mold, alternate ends of said main flowpassages being sealed at one of the sides of the mold to form an inlet and an outlet at the remaining unsealed end, a plurality of branch flowpassages being only one greater in number that the number of cavity halves, and which are transverse to said main flowpassages in the side projected surface and being arranged between and on opposing sides of the cavities of the mold at regular, uniform intervals, having ends communicating with the top and bottom of the mold half and sealed at both ends thereof whereby the length of the branch flowpassages are at least as long as the height of the mold cavities, the distance of the branch flowpassages from said mating surface being no greater than the depth of the mold cavities measured from said mating surface, connecting flowpassages transverse to both said main and said branch flowpassages to bring said branch flowpassages and said main flowpassages into communication with one another to constitute temperature controlling flowpassages in the form of ladder network, said branch flowpassages being closer to said engaging surface than said main flowpassages to more effectively cool said cavities, and a cooling medium or heating medium in said temperature controlling flowpassages to cause the medium to flow through said temperature controlling flowpassages to maintain the cavities at substantially the same temperature, one end of each of said connecting flowpassages terminating at one side surface of the mold and being sealed, said main branch and connecting flowpassages being arranged so that the path length of any path between said inlet and said outlet is the same regardless of the branch passageway which forms part of said path.

2. A mold according to claim 1, wherein said main flowpassages and said branch flowpassages have ends of bores blocked, have the same diameters and are disposed longitudinally and laterally of the mold, respectively.

3. The mold according to claim 8 wherein the spacing between the main flowpassage and the branch flowpassage is determined depending on a dimension of the cavity, the spacing being set constant including a distance with respect to the center of the cavity.

4. The mold according to claim 8 wherein said mold comprises an injection mold, a parison temperature controlling mold and a blow mold.

5. The mold of claim 1 wherein said mold halves each have a second surface opposite and substantial parallel to said engaging surface, said connecting flowpassages extending between said branch flowpassages and said second surface and interconnected with said main flowpassages to provide a fluid path between said main flowpassages and said branch flow passages;

the sealed ends of said connecting flowpassages being plugged at said second surface.

6. The mold of claim 8, wherein said connecting flowpassages providing fluid coupling between the main and branch flowpassages extend to one surface of said mold and include means for plugging the connecting passageways at said mold surface.

7. The mold of claim 8, wherein all of the flowpassages are of the same uniform diameter.

* * * * *

UNITED STATES PATENT AND TRADEMARK OFFICE
CERTIFICATE OF CORRECTION

PATENT NO. : 4,703,912
DATED : November 3, 1987
INVENTOR(S) : Katashi Aoki

It is certified that error appears in the above-identified patent and that said Letters Patent is hereby corrected as shown below:

IN THE SPECIFICATION

Column 1, line 46, before "sides" insert --the--.

IN THE CLAIMS

Claim 3, line 1, change "8" to --1--.
Claim 4, line 1, change "8" to --1--.
Claim 6, line 1, change "8" to --1--.
Claim 7, line 1, change "8" to --1--.

Signed and Sealed this

Twenty-ninth Day of March, 1988

Attest:

DONALD J. QUIGG

Attesting Officer

Commissioner of Patents and Trademarks